US012105470B2

(12) United States Patent
Ishizuka et al.

(10) Patent No.: US 12,105,470 B2
(45) Date of Patent: Oct. 1, 2024

(54) TONER FOR DEVELOPING ELECTROSTATIC CHARGE IMAGE, ELECTROSTATIC CHARGE IMAGE DEVELOPER, TONER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Daisuke Ishizuka, Kanagawa (JP); Eiji Kawakami, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 551 days.

(21) Appl. No.: 17/493,107

(22) Filed: Oct. 4, 2021

(65) Prior Publication Data

US 2022/0390864 A1 Dec. 8, 2022

(30) Foreign Application Priority Data

May 25, 2021 (JP) ................................ 2021-087872

(51) Int. Cl.
*G03G 9/08* (2006.01)
*G03G 15/08* (2006.01)

(52) U.S. Cl.
CPC ......... *G03G 9/0819* (2013.01); *G03G 9/0821* (2013.01); *G03G 9/0827* (2013.01); *G03G 15/08* (2013.01)

(58) Field of Classification Search
CPC .. G03G 9/0819; G03G 9/0821; G03G 9/0827; G03G 9/08797
See application file for complete search history.

(56) References Cited

U.S. PATENT DOCUMENTS

| | | | |
|---|---|---|---|
| 8,304,156 B2 | 11/2012 | Akiyama et al. | |
| 8,535,866 B2 | 9/2013 | Tomonaga et al. | |
| 8,865,383 B2 | 10/2014 | Suzuki et al. | |
| 10,423,090 B2 | 9/2019 | Ohtsu et al. | |
| 2010/0183966 A1 | 7/2010 | Kadokura et al. | |

(Continued)

FOREIGN PATENT DOCUMENTS

| | | | |
|---|---|---|---|
| JP | 2008-216702 * | 9/2008 | ............ G03G 15/01 |
| JP | 2010-249918 A | 11/2010 | |

(Continued)

OTHER PUBLICATIONS

Translation of JP 2008-216702.*

(Continued)

*Primary Examiner* — Peter L Vajda
(74) *Attorney, Agent, or Firm* — Sughrue Mion, PLLC

(57) ABSTRACT

A toner for developing an electrostatic charge image contains toner particles including first toner particles and second toner particles, the first toner particles having a brightness of less than 90 and the second toner particles having a brightness of 90 or more. The second toner particles constitute 0.1% by number or more and 10% by number or less of the toner particles, and, in the size distribution of the second toner particles, toner particles having a diameter equal to or smaller than the number-average diameter Dn of the toner particles constitute 70% by number or more.

14 Claims, 2 Drawing Sheets

(56) References Cited

U.S. PATENT DOCUMENTS

| | | | |
|---|---|---|---|
| 2011/0081608 A1 | 4/2011 | Yaguchi et al. | |
| 2013/0244158 A1 | 9/2013 | Awamura et al. | |
| 2018/0164709 A1 | 6/2018 | Taguchi et al. | |
| 2019/0018328 A1* | 1/2019 | Miyoshi ............... | G03G 9/0902 |

FOREIGN PATENT DOCUMENTS

| | | | | |
|---|---|---|---|---|
| JP | 2010-249919 A | 11/2010 | | |
| JP | 2012-78423 A | 4/2012 | | |
| JP | 2018-87901 A | 6/2018 | | |
| JP | 2019-101279 A | 6/2019 | | |
| KR | 2005-0009177 * | 1/2005 | ......... | G03G 9/08795 |

OTHER PUBLICATIONS

Translation of KR 2005-0009177.*
Extended European Search Report dated Apr. 19, 2022, issued in European Application No. 21205881.2.

* cited by examiner

TONER FOR DEVELOPING ELECTROSTATIC CHARGE IMAGE, ELECTROSTATIC CHARGE IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2021-087872 filed May 25, 2021.

BACKGROUND

(i) Technical Field

The present disclosure relates to toner for developing an electrostatic charge image, an electrostatic charge image developer, a toner cartridge, a process cartridge, an image forming apparatus, and an image forming method.

(ii) Related Art

Electrophotography and other techniques for visualizing image information are used in various fields today. In electrophotographic visualization of image information, the surface of an image carrier is charged, and an electrostatic charge image, which is the image information, is created thereon. Then a developer, which contains toner, is applied to form a toner image on the surface of the image carrier. This toner image is transferred to a recording medium and fixed on the recording medium.

For example, Japanese Unexamined Patent Application Publication No. 2010-249919 discloses "a yellow toner comprising binder resin particles that do not contain a coloring agent or a release agent and have a shape factor SF1 of 110 or less, the number of the binder resin particles being 50 or less per 5,000 electrostatic developing toner particles."

Japanese Unexamined Patent Application Publication No. 2010-249918 discloses "a magenta toner comprising binder resin particles that do not contain a coloring agent or a release agent and have a shape factor SF1 of 110 or less, the number of the binder resin particles being 50 or less per 5,000 electrostatic developing toner particles."

Japanese Unexamined Patent Application Publication No. 2012-078423 discloses "a toner, comprising: a crystalline polyester forming domains in the toner; and a colorant being dispersed in the domains of the crystalline polyester."

Japanese Unexamined Patent Application Publication No. 2018-087901 discloses "an electrostatic latent image developing toner comprising a styrene acrylic resin and a crystalline resin, wherein the average dispersion diameter of a colorant in is 100-400 nm."

Japanese Unexamined Patent Application Publication No. 2019-101279 discloses "a magenta toner comprising a particular colorant, wherein in the cross section of the toner particles, a length of the cross section of crystals of crystalline polyester is 50 nm or less."

SUMMARY

Aspects of non-limiting embodiments of the present disclosure relate to a toner for developing an electrostatic charge image, the toner containing toner particles including first toner particles, having a brightness of less than 90, and second toner particles, having a brightness of 90 or more. With this toner, compared with ones for which the second toner particles constitute less than 0.1% by number of all toner particles or for which, in the size distribution of the second toner particles, toner particles having a diameter equal to or smaller than the number-average diameter Dn of all toner particles constitute less than 70% by number, variations in gloss may be minor that can occur when a solid image is formed repeatedly on a small and thick recording medium in a low-temperature environment.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a toner for developing an electrostatic charge image, the toner containing toner particles including first toner particles and second toner particles, the first toner particles having a brightness of less than 90 and the second toner particles having a brightness of 90 or more. The second toner particles constitute 0.1% by number or more and 10% by number or less of the toner particles, and, in a size distribution of the second toner particles, toner particles having a diameter equal to or smaller than a number-average diameter Dn of the toner particles constitute 70% by number or more.

BRIEF DESCRIPTION OF THE DRAWINGS

Exemplary embodiments of the present disclosure will be described in detail based on the following figures, wherein.

DETAILED DESCRIPTION

Figure 1:
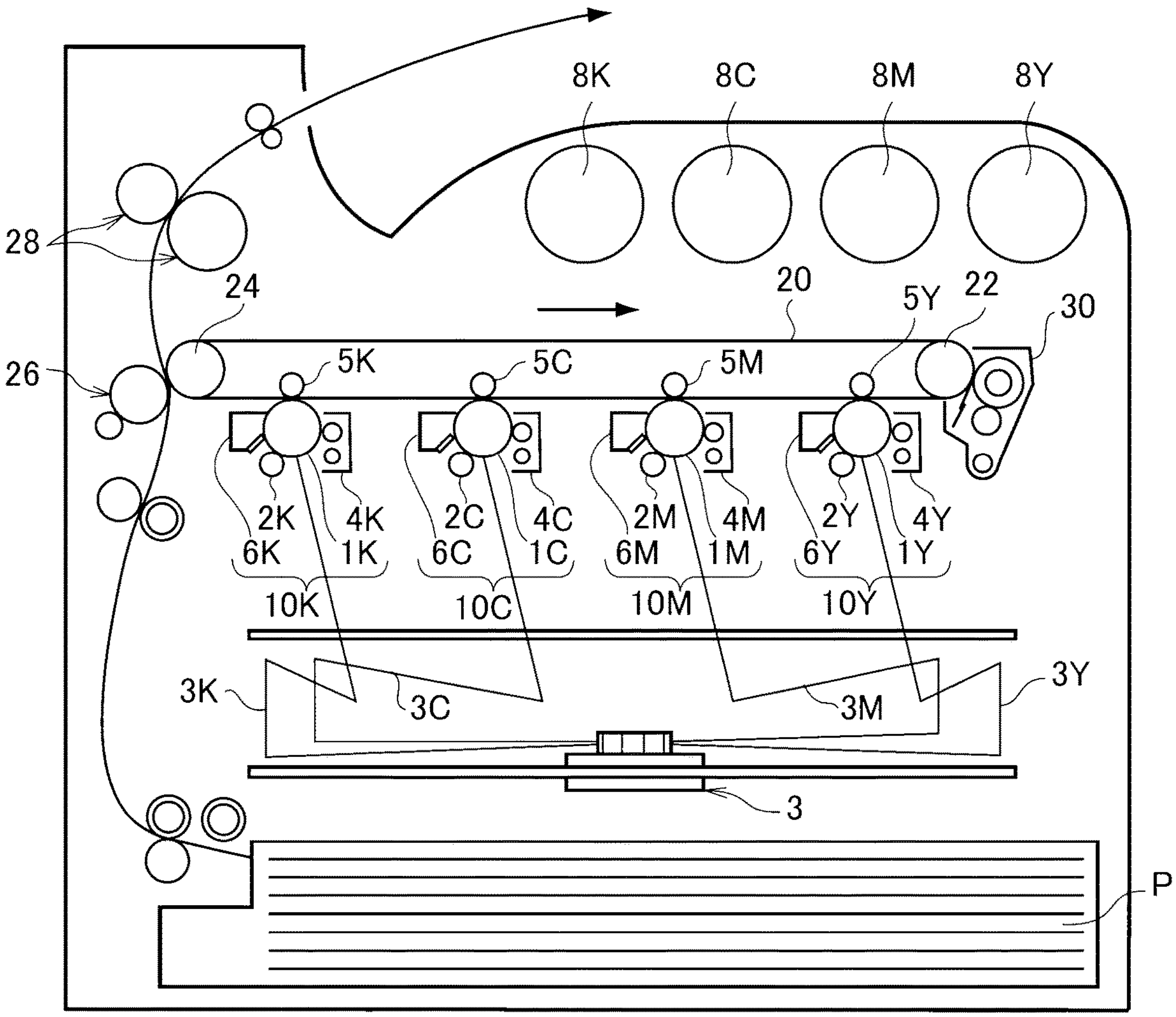
FIG. 1 is a schematic view of the structure of an example of an image forming apparatus according to an exemplary embodiment.

The following describes exemplary embodiments of the present disclosure. The following description and Examples are merely examples of the disclosure and do not limit the scope of the disclosure.

Numerical ranges specified with "A-B," "between A and B," "(from) A to B," etc., herein represent inclusive ranges, which include the minimum A and the maximum B as well as all values in between.

The following description also includes series of numerical ranges. In such a series, the upper or lower limit of a numerical range may be substituted with that of another in the same series. The upper or lower limit of a numerical range, furthermore, may be substituted with a value indicated in the Examples section.

A gerund or action noun used in relation to a certain process or method herein does not always represent an independent action. As long as its purpose is fulfilled, the action represented by the gerund or action noun may be continuous with or part of another.

A description of an exemplary embodiment herein may make reference to drawing(s). The reference, however, does not mean that what is illustrated is the only possible configuration of the exemplary embodiment. The size of elements in each drawing is conceptual; the relative sizes of the elements do not need to be as illustrated.

An ingredient herein may be a combination of multiple substances. If a composition described herein contains a combination of multiple substances as one of its ingredients, the amount of the ingredient represents the total amount of the substances in the composition unless stated otherwise.

An ingredient herein, furthermore, may be a combination of multiple kinds of particles. If a composition described herein contains a combination of multiple kinds of particles as one of its ingredients, the diameter of particles of the ingredient is that of the mixture of the multiple kinds of particles present in the composition.

"Toner for developing an electrostatic charge image" herein may be referred to simply as "toner." "An electrostatic charge image developer" herein may be referred to simply as "a developer."

Toner for Developing an Electrostatic Charge Image

Toner according to an exemplary embodiment contains toner particles including first toner particles, having a brightness of less than 90 (hereinafter also referred to as "colored toner particles"), and second toner particles, having a brightness of 90 or more (hereinafter also referred to as "transparent toner particles" for convenience).

The transparent toner particles constitute 0.1% by number or more and 10% by number or less of the toner particles; and in the size distribution of the second toner particles, toner particles having a diameter equal to or smaller than the number-average diameter Dn of the toner particles constitute 70% by number or more.

With the toner according to this exemplary embodiment, configured as such, variations in gloss may be minor that can occur when a solid image is formed repeatedly on a small and thick recording medium in a low-temperature environment. A possible reason is as follows.

In a low-temperature environment (e.g., under 8° C. conditions), repeatedly forming a solid image (e.g., with 5 $g/m^2$ or more toner) on a small and thick recording medium (e.g., postcards or similar thick pieces of paper) can cause gloss to vary within the image on one single piece of the recording medium or between images on different pieces. Presumably, this is because of unevenness in the temperature inside the fixing element or imprecise control of the temperature of the fixing device.

When known toner particles containing a coloring agent are heated to melt, the coloring agent forms a network, sometimes making the toner particles elastic. Since the development of elasticity depends on temperature, the elasticity of the molten toner particles varies with the fixing temperature, and so does surface irregularity of the resulting image. The result is temperature dependence of gloss. One possible way to address this may be to reduce the change in viscosity caused by a given change in temperature by controlling the crosslink structure or molecular weight distribution of the binder resin(s) in the toner particles. It is, however, difficult to eliminate the change in viscosity caused by a change in temperature. With this approach, gloss still can vary.

The toner according to this exemplary embodiment is made with toner particles including colored toner particles, having a brightness of less than 90, and transparent toner particles, having a brightness of 90 or more.

The colored toner particles, having a brightness of less than 90, are ordinary ones; they are of low brightness and contain coloring agent(s). The transparent toner particles, having a brightness of 90 or more, are substantially colorless or transparent ones; they are of high brightness and contain no coloring agent, or the coloring agent content is 1% by mass or less of binder resin(s).

The transparent toner particles, therefore, are not prone to be rendered elastic by coloring agent(s) and are relatively low-elasticity compared with the colored toner particles.

The transparent toner particles, having such a nature, also have small diameters; toner particles having a diameter equal to or smaller than the number-average diameter Dn of all toner particles constitute 70% by number or more of them. In addition, the transparent toner particles are in the minority; they constitute 0.1% by number or more and 10% by number or less of all toner particles. These ensure the transparent toner particles will be present between the colored ones when the toner is fixed.

Even if the surface irregularity of the toner image varies, therefore, the pressure applied during fixation will force the transparent toner particles to melt and penetrate to fill the gaps between the colored toner particles.

The resulting images will be smooth, regardless of to what extent the colored toner particles will have melted. As a result, gloss will depend little on the fixing temperature; even if a solid image is formed repeatedly on a small and thick recording medium in a low-temperature environment, gloss will vary little.

Presumably for these reasons, the toner according to this exemplary embodiment allows for repeated formation of a solid image with minor variations in gloss, even on a small and thick recording medium in a low-temperature environment.

The following describes the toner according to this exemplary embodiment in detail.

The toner according to this exemplary embodiment contains toner particles. The toner may contain external additives, i.e., additives present in the toner but outside the toner particles.

Toner Particles

The toner particles include colored and transparent toner particles. The colored toner particles have a brightness of less than 90, and the transparent toner particles have a brightness of 90 or more.

Percentage by Number of the Transparent Toner Particles

The transparent toner particles constitute 0.1% by number or more and 10% by number or less of all toner particles. This percentage may be 2% by number or more and 9% by number or less; this may help further reduce variations in gloss. Preferably, this percentage is 4% by number or more and 8% by number or less.

The colored toner particles constitute the rest, i.e., the toner particles excluding the transparent ones, of the toner particles.

In the size distribution of the transparent toner particles, toner particles having a diameter equal to or smaller than the number-average diameter Dn of all toner particles constitute 70% by number or more. This percentage may be 80% by number or more. Preferably, this percentage is 90% by number or more.

The percentage of toner particles having a diameter equal to or smaller than the number-average diameter Dn of all toner particles in the size distribution of the transparent toner particles may even be 100% by number.

The number-average diameter Dn of all toner particles may be 3 μm or more and 7 μm or less. Preferably, Dn is 3.5 μm or more and 6.5 μm or less, more preferably 4 μm or more and 6 μm or less.

The number-average diameter Dn of all toner particles and the size distribution and percentage of the transparent toner particles are measured as follows.

A portion of the toner particles of interest is collected by aspiration in such a manner that it will form a flat stream. This flat stream is photographed with a flash to capture the figures of the particles in a still image. The images of sampled particles are analyzed using a wet flow particle-diameter and shape analyzer (FPIA-3000, Malvern Panalytical), and the characteristics of interest are determined from the results.

Specifically, the toner particles of interest are imaged, and the size distribution of 5000 sampled toner particles is determined from the diameters (equivalent circular diameters) of the particle images. The determined size distribution is transformed into a plot of a cumulative distribution of frequency starting from the smallest diameter. The particle diameter at which the cumulative frequency is 50% is the number-average diameter Dn of the toner particles.

Based on the equivalent circular diameter and brightness of the particle images, the particles are classified into transparent and colored ones. The brightness is that on the 256-level gray scale (0 to 255; 0, dark; 255, light). The transparent toner particles are counted, and the number is used to determine the percentage of the transparent toner particles to all toner particles.

The size distribution of the transparent toner particles is also determined, and the percentage of toner particles as small as or smaller than the number-average diameter Dn of all toner particles is determined.

If the toner contains external additives, the external additives are removed beforehand by dispersing the toner (developer) of interest in water containing a surfactant and then sonicating the resulting dispersion.

Circularity of the Toner Particles

The transparent toner particles may have a greater average circularity than the colored toner particles.

Specifically, the difference between the average circularity of the colored toner particles and that of the transparent toner particles may be 0.01 or more. Preferably, this difference is 0.015 or more, more preferably 0.02 or more.

During the fixation of the toner image, as stated, the fixing pressure will force the transparent toner particles to melt and penetrate to fill the gaps between the colored toner particles. The inventors believe when the second toner particles have a greater average circularity than the first toner particles, this penetration of molten transparent toner particles will take place more easily, making it more certain that variations in gloss will be reduced.

The average circularity of the colored toner particles may be 0.930 or more and 0.960 or less. Preferably, this average circularity is 0.935 or more and 0.955 or less, more preferably 0.94 or more and 0.95 or less.

An average circularity of the colored toner particles in any of these ranges will make it more certain that variations in gloss will be reduced. In that case, the inventors believe, the colored toner particles are irregular in shape to an appropriate extent. When the toner image is fixed, therefore, the colored toner particles will be spaced apart more certainly. As a result, the penetration of molten transparent toner particles, caused by the fixing pressure and to fill the gaps between the colored toner particles, will take place more easily.

The average circularity of the colored toner particles and that of the transparent toner particles are given by (circumference of the equivalent circle)/(circumference) [(circumference of circles having the same projected area as particle images)/(circumference of projected images of the particles)]. Specifically, the average circularities can be measured as follows.

A portion of the toner particles of interest is collected by aspiration in such a manner that it will form a flat stream. This flat stream is photographed with a flash to capture the figures of the particles in a still image. The images of sampled particles are analyzed using a wet flow particle-diameter and shape analyzer (FPIA-3000, Malvern Panalytical), and the average circularities are determined from the results.

To be more specific, the toner particles of interest are imaged first.

Based on the brightness of the particle images, the particles are classified into transparent and colored ones. The brightness is that on the 256-level gray scale (0 to 255; 0, dark; 255, light). The arithmetic mean of the circularity of the colored toner particles is the average circularity of the colored toner particles, and that of the transparent toner particles is the average circularity of the transparent toner particles.

If the toner contains external additives, the external additives are removed beforehand by dispersing the toner (developer) of interest in water containing a surfactant and then sonicating the resulting dispersion.

Relative Areas of Crystalline-Resin Domains

In a cross-sectional observation of the colored and transparent toner particles, Ss may be larger than Sf, where Ss is the relative area of crystalline-resin domains to the particle cross-sectional area in the transparent toner particles, and Sf is that in the colored toner particles.

Specifically, the relative areas Sf and Ss of crystalline-resin domains to the particle cross-sectional area in the colored and transparent toner particles, respectively, may be such that Ss/Sf 1.2. Preferably, Ss/Sf 2.5, more preferably Ss/Sf 3.0.

Crystalline resins and coloring agents are incompatible. When the relative area of crystalline resin in a collection of toner particles is large, therefore, it means the toner particles contain little or no coloring agent. The resulting toner particles, therefore, tend to be transparent, even if produced by kneading and milling.

When the relative area of crystalline resin in the transparent toner particles is large, furthermore, variations in gloss will be reduced more certainly. In that case the transparent toner particles will melt, and therefore smoothen the surface of the image, more easily.

The relative area Ss of crystalline-resin domains to the particle cross-sectional area in the transparent toner particles may be 50% or more and 80% or less; this may help further reduce variations in gloss. Preferably, Ss is 55% or more and 75% or less, more preferably 60% or more and 70% or less.

The relative areas of crystalline-resin domains are measured as follows.

A portion of the toner particles (or toner particles with attached external additives on) is mixed into epoxy resin, and the epoxy resin is cured. The resulting solid is sliced using an ultramicrotome (Leica Ultracut UCT) to give a thin specimen having a thickness of 80 nm or more and 130 nm or less. The specimen is stained with ruthenium tetroxide for 3 hours in a desiccator at 30° C. A STEM image (acceleration voltage, 30 kV; magnification, 20000) of the stained specimen is obtained through transmission imaging using an ultrahigh-resolution field-emission scanning electron microscope (FE-SEM; Hitachi High-Technologies S-4800).

For each toner particle, the domains therein are examined to determine, from contrast and shape, whether each of them is a domain of crystalline resin or not. In the SEM image, resins, rich in double bonds, appear stained darker with ruthenium tetroxide than any other material (e.g., a release agent, if used; described later herein), and amorphous resins appear stained darker than crystalline resins. By using this, one can distinguish between domains of binder resins and any other material and between domains of crystalline and amorphous resins.

To be more specific, domains of any material other than binder resins are stained the lightest with ruthenium, crystalline-resin (e.g., crystalline polyester resin) domains the second lightest, and amorphous-resin (e.g., amorphous polyester resin) domains are stained the darkest. The contrast may be adjusted to make miscellaneous domains look white, amorphous-resin domains look black, and crystalline-resin domains look light gray. Now each domain can be identified by color.

The ruthenium-stained crystalline-resin domains are then examined to determine the relative area of crystalline-resin domains to the particle cross-sectional area in the toner particles.

For this analysis, the toner particles are classified into colored ones (first toner particles, having a brightness of less than 90) and transparent ones (second toner particles, having a brightness of 90 or more) based on the brightness on the 256-level gray scale (0 to 255; 0, dark; 255, light). The arithmetic mean of the relative area of crystalline-resin domains in 500 colored toner particles is the relative area of crystalline-resin domains to the particle cross-sectional area in the colored toner particles, and that in 500 transparent toner particles is the relative area of crystalline-resin domains to the particle cross-sectional area in the transparent toner particles.

Construction of the Toner Particles

The colored toner particles contain, for example, at least one binder resin and at least one coloring agent, optionally with a release agent and/or other additives.

The transparent toner particles contain at least one binder resin, optionally with a release agent and/or other additives. It should be noted that the transparent toner particles may contain a slight amount of coloring agent.

Binder Resins

Examples of binder resins include vinyl resins that are homopolymers of monomers such as styrenes (e.g., styrene, para-chlorostyrene, and α-methylstyrene), (meth)acrylates (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenic unsaturated nitriles (e.g., acrylonitrile and methacrylonitrile), vinyl ethers (e.g., vinyl methyl ether and vinyl isobutyl ether), vinyl ketones (e.g., vinyl methyl ketone, vinyl ethyl ketone, and vinyl isopropenyl ketone), and olefins (e.g., ethylene, propylene, and butadiene) or copolymers of two or more such monomers.

Non-vinyl resins, such as epoxy resins, polyester resins, polyurethane resins, polyamide resins, cellulose resins, polyether resins, and modified rosin, mixtures of any such resin and vinyl resin(s), and graft copolymers obtained by polymerizing a vinyl monomer in the presence of any such non-vinyl resin may also be used.

One such binder resin may be used alone, or two or more may be used in combination.

In particular, the binder resin may include an amorphous resin and a crystalline resin.

The ratio by mass between the amorphous and crystalline resins (crystalline/amorphous) may be 2/98 or more and 50/50 or less. Preferably, this ratio is 4/96 or more and 30/70 or less.

For the colored toner particles, the ratio by mass between the amorphous and crystalline resins (crystalline/amorphous) may be 3/97 or more and 30/70 or less.

As for the transparent toner particles, the ratio by mass between the amorphous and crystalline resins (crystalline/amorphous) may be 60/40 or more and 95/5 or less.

An amorphous resin herein represents a resin whose DSC curve, a thermal spectrum measured by differential scanning calorimetry, has no clear endothermic peak and only shows stepwise endothermic changes. An amorphous resin is solid at room temperature and thermoplasticizes at temperatures equal to or higher than its glass transition temperature.

A crystalline resin, by contrast, is a resin whose DSC curve has a clear endothermic peak rather than stepwise endothermic changes.

To take a specific example, if a crystalline resin is analyzed by DSC at a heating rate of 10° C./min, the DSC curve has an endothermic peak with a full width at half maximum (half width) of 10° C. or narrower. If an amorphous resin is analyzed likewise, the DSC curve has an endothermic peak with a half width broader than 10° C. or no clear endothermic peak.

The amorphous resin may be as described below.

Examples of amorphous resins include known amorphous resins, such as amorphous polyester resins, amorphous vinyl resins (e.g., styrene-acrylic resins), epoxy resins, polycarbonate resins, and polyurethane resins. Of these, it is preferred to use an amorphous polyester or vinyl (styrene-acrylic in particular) resin, more preferably an amorphous polyester resin.

A combination of amorphous polyester and styrene-acrylic resins may also be used. The amorphous resin may even be one that has a segment of amorphous polyester resin and a segment of styrene-acrylic resin.

Amorphous Polyester Resin

An example of an amorphous polyester resin is a polycondensate of polycarboxylic acid(s) and polyhydric alcohol (s). Either commercially available or synthesized amorphous polyester resins may be used.

Examples of polycarboxylic acids include aliphatic dicarboxylic acids (e.g., oxalic acid, malonic acid, maleic acid, fumaric acid, citraconic acid, itaconic acid, glutaconic acid, succinic acid, alkenylsuccinic acids, adipic acid, and sebacic acid), alicyclic dicarboxylic acids (e.g., cyclohexanedicarboxylic acid), aromatic dicarboxylic acids (e.g., terephthalic acid, isophthalic acid, phthalic acid, and naphthalenedicarboxylic acid), and anhydrides and lower-alkyl (e.g., C1-5 alkyl) esters thereof. Of these, aromatic dicarboxylic acids are preferred.

A combination of a dicarboxylic acid and a crosslinked or branched carboxylic acid having three or more carboxylic groups may also be used. Examples of carboxylic acids having three or more carboxylic groups include trimellitic acid, pyromellitic acid, and anhydrides and lower-alkyl (e.g., C1-5 alkyl) esters thereof.

One polycarboxylic acid may be used alone, or two or more may be used in combination.

Examples of polyhydric alcohols include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexanedimethanol, and hydrogenated bisphenol A), and aromatic diols (e.g., ethylene oxide adducts of bisphenol A and propylene oxide adducts of bisphenol A). Of these, aromatic diols and alicyclic diols are preferred, and aromatic diols are more preferred.

A combination of a diol and a crosslinked or branched polyhydric alcohol having three or more hydroxyl groups may also be used. Examples of polyhydric alcohols having three or more hydroxyl groups include glycerol, trimethylolpropane, and pentaerythritol.

One polyhydric alcohol may be used alone, or two or more may be used in combination.

An amorphous polyester resin can be produced by known methods. A specific example is to polymerize the raw materials at a temperature of 180° C. or more and 230° C. or less. The pressure in the reaction system may optionally be reduced to remove the water and alcohol that are produced as condensation proceeds. If the raw-material monomers do not dissolve or are not miscible together at the reaction temperature, a high-boiling solvent may be added as a solubilizer to make the monomers dissolve. In that case, the solubilizer is removed by distillation during the polycondensation. Any monomer not miscible with the other(s) may be condensed with the planned counterpart acid(s) or alcohol(s) before the polycondensation process.

Besides native amorphous polyester resins, modified amorphous polyester resins may also be used. A modified amorphous polyester resin is an amorphous polyester resin having a non-ester linking group or containing a non-polyester resin component bound by covalent, ionic, or any other form of bonding. An example is a terminally modified resin obtained by reacting a terminally functionalized amorphous polyester resin, for example having a terminal isocyanate group, with an active hydrogen compound.

The amorphous polyester resin may constitute 60% by mass or more and 98% by mass or less of all binder resins. Preferably, the amorphous polyester resin constitutes 65% by mass or more and 95% by mass or less, more preferably 70% by mass or more and 90% by mass or less, of all binder resins.

Styrene-Acrylic Resin

A styrene-acrylic resin is a copolymer of at least a styrene monomer (monomer having the styrene structure) and a (meth)acrylic monomer (monomer having a (meth)acrylic group, preferably a (meth)acryloxy group). Examples of styrene-acrylic resins include copolymers of a styrene monomer and a (meth)acrylate monomer.

A styrene-acrylic resin has an acrylic-resin substructure formed by the polymerization of an acrylic monomer, methacrylic monomer, or both. The expression "(meth)acrylic" encompasses both "acrylic" and "methacrylic," and the expression "(meth)acrylate" encompasses both an "acrylate" and a "methacrylate."

Examples of styrene monomers include styrene, α-methylstyrene, meta-chlorostyrene, para-chlorostyrene, para-fluorostyrene, para-methoxystyrene, meta-tert-butoxystyrene, para-tert-butoxystyrene, para-vinylbenzoic acid, and para-methyl-α-methylstyrene. One styrene monomer may be used alone, or two or more may be used in combination.

Examples of (meth)acrylic monomers include (meth) acrylic acid, methyl (meth)acrylate, ethyl (meth)acrylate, n-propyl (meth)acrylate, isopropyl (meth)acrylate, n-butyl (meth)acrylate, isobutyl (meth)methacrylate, n-hexyl (meth) acrylate, 2-ethylhexyl (meth)acrylate, lauryl (meth)acrylate, stearyl (meth)acrylate, cyclohexyl (meth)acrylate, dicyclopentanyl (meth)acrylate, isobornyl (meth)acrylate, 2-hydroxyethyl (meth)acrylate, hydroxypropyl (meth)acrylate, and 4-hydroxybutyl (meth)acrylate. One (meth)acrylic monomer may be used alone, or two or more may be used in combination.

The ratio between the styrene and (meth)acrylic monomers in the polymerization may be between 70:30 and 95:5 (styrene:(meth)acrylic) on a mass basis.

A crosslinked styrene-acrylic resin may also be used. An example is a copolymer of at least a styrene monomer, a (meth)acrylic monomer, and a crosslinking monomer. The crosslinking monomer can be of any kind, but an example is a (meth)acrylate compound having two or more functional groups.

How to produce the styrene-acrylic resin is not critical. Techniques such as solution polymerization, precipitation polymerization, suspension polymerization, bulk polymerization, and emulsion polymerization can be used. The polymerization reactions can be done by known processes (batch, semicontinuous, continuous, etc.).

The styrene-acrylic resin may constitute 0% by mass or more and 20% by mass or less of all binder resins. Preferably, the styrene-acrylic resin constitutes 1% by mass or more and 15% by mass or less, more preferably 2% by mass or more and 10% by mass or less, of all binder resins.

Amorphous Resin Having a Segment of Amorphous Polyester Resin and a Segment of Styrene-Acrylic Resin (hereinafter also referred to as "hybrid amorphous resin")

A hybrid amorphous resin is an amorphous resin having a segment of amorphous polyester resin and a segment of styrene-acrylic resin chemically bound together.

Examples of hybrid amorphous resins include resins having a polyester backbone and styrene-acrylic side chains chemically bound to the backbone; resins having a styrene-acrylic backbone and polyester side chains chemically bound to the backbone; resins whose backbone is formed by polyester and styrene-acrylic resins chemically bound together; and resins having a backbone formed by polyester and styrene-acrylic resins chemically bound together and polyester and/or styrene-acrylic side chains chemically bound to the backbone.

The amorphous polyester and styrene-acrylic resins in each segment are not described; they are as described above.

The combined percentage of the polyester and styrene-acrylic segments to the hybrid amorphous resin as a whole may be 80% by mass or more. Preferably, this percentage is 90% by mass or more, more preferably 95% by mass or more, even more preferably 100% by mass.

In a hybrid amorphous resin, the percentage of the styrene-acrylic-resin segment to the polyester and styrene-acrylic segments combined may be 20% by mass or more and 60% by mass or less. Preferably, this percentage is 25% by mass or more and 55% by mass or less, more preferably 30% by mass or more and 50% by mass or less.

A hybrid amorphous resin may be produced by any of methods (i) to (iii) below.

(i) The polyester segment is produced by polycondensation between polyhydric alcohol(s) and polycarboxylic acid(s). Then the monomer that will form the styrene-acrylic segment is polymerized by addition polymerization.

(ii) The styrene-acrylic segment is produced by addition polymerization of a monomer capable of this type of polymerization. Then polyhydric alcohol(s) and polycarboxylic acid(s) are polycondensed.

(iii) Polyhydric alcohol(s) and polycarboxylic acid(s) are polycondensed, and a monomer capable of addition polymerization is polymerized by addition polymerization at the same time.

The hybrid amorphous resin may constitute 60% by mass or more and 98% by mass or less of all binder resins. Preferably, the hybrid amorphous resin constitutes 65% by mass or more and 95% by mass or less, more preferably 70% by mass or more and 90% by mass or less, of all binder resins.

Some characteristics of the amorphous resin may be as follows.

The glass transition temperature (Tg) of the amorphous resin may be 50° C. or more and 80° C. or less. Preferably, Tg is 50° C. or more and 65° C. or less.

This glass transition temperature is that determined from the DSC curve of the resin, which is measured by differential scanning calorimetry (DSC). More specifically, this glass transition temperature is the "extrapolated initial temperature of glass transition" as in the methods for determining glass transition temperatures set forth in JIS K 7121: 1987 "Testing Methods for Transition Temperatures of Plastics."

The weight-average molecular weight (Mw) of the amorphous resin may be 5000 or more and 1000000 or less. Preferably, Mw is 7000 or more and 500000 or less.

The number-average molecular weight (Mn) of the amorphous resin may be 2000 or more and 100000 or less.

The molecular weight distribution, Mw/Mn, of the amorphous resin may be 1.5 or more and 100 or less. Preferably, Mw/Mn is 2 or more and 60 or less.

These weight- and number-average molecular weights are those measured by gel permeation chromatography (GPC). The analyzer is Tosoh's HLC-8120 GPC chromatograph with Tosoh's TSKgel SuperHM-M column (15 cm), and the eluate is tetrahydrofuran (THF). Comparing the measured data with a molecular-weight calibration curve prepared using monodisperse polystyrene standards will give the weight- and number-average molecular weights.

The crystalline resin may be as described below.

Examples of crystalline resins include known crystalline resins, such as crystalline polyester resins and crystalline vinyl resins (e.g., polyalkylene resins and long-chain alkyl (meth)acrylate resins). Of these, it is preferred to use a crystalline polyester resin; this may improve the mechanical strength and fixation at low temperatures of the toner.

Crystalline Polyester Resin

An example of a crystalline polyester resin is a polycondensate of polycarboxylic acid(s) and polyhydric alcohol(s). Either commercially available or synthesized crystalline polyester resins may be used.

Crystalline polyester resins made with linear aliphatic polymerizable monomers form a crystal structure more easily than those made with aromatic polymerizable monomers.

Examples of polycarboxylic acids include aliphatic dicarboxylic acids (e.g., oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (e.g., dibasic acids, such as phthalic acid, isophthalic acid, terephthalic acid, and naphthalene-2,6-dicarboxylic acid), and anhydrides and lower-alkyl (e.g., C1-5 alkyl) esters thereof.

A combination of a dicarboxylic acid and a crosslinked or branched carboxylic acid having three or more carboxylic groups may also be used. Examples of carboxylic acids having three or more carboxylic groups include aromatic carboxylic acids (e.g., 1,2,3-benzenetricarboxylic acid, 1,2,4-benzenetricarboxylic acid, and 1,2,4-naphthalenetricarboxylic acid) and anhydrides and lower-alkyl (e.g., C1-5 alkyl) esters thereof.

A combination of a dicarboxylic acid such as listed above and a dicarboxylic acid having a sulfonic acid group or an ethylenic double bond may also be used.

One polycarboxylic acid may be used alone, or two or more may be used in combination.

Examples of polyhydric alcohols include aliphatic diols (e.g., C7-20 linear aliphatic diols). Examples of aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Of these, 1,8-octanediol, 1,9-nonanediol, and 1,10-decanediol are preferred.

A combination of a diol and a crosslinked or branched alcohol having three or more hydroxyl groups may also be used. Examples of alcohols having three or more hydroxyl groups include glycerol, trimethylolethane, trimethylolpropane, and pentaerythritol.

One polyhydric alcohol may be used alone, or two or more may be used in combination.

In the polyhydric alcohol(s), the percentage of aliphatic diols may be 80 mol % or more. Preferably, the percentage of aliphatic diols is 90 mol % or more.

A crystalline polyester resin can be produced by known methods, for example in the same way as an amorphous polyester resin.

The crystalline polyester resin may be a polymer formed by linear aliphatic α,ω-dicarboxylic acid(s) and linear aliphatic α,ω-diol(s).

The linear aliphatic α,ω-dicarboxylic acid(s) may be one(s) having a C3 to C14 alkylene group between the two carboxy groups. Preferably, the number of carbon atoms in the alkylene group is 4 or more and 12 or less, more preferably 6 or more and 10 or less.

Examples of linear aliphatic α,ω-dicarboxylic acids include succinic acid, glutaric acid, adipic acid, 1,6-hexanedicarboxylic acid (commonly known as suberic acid), 1,7-heptanedicarboxylic acid (commonly known as azelaic acid), 1,8-octanedicarboxylic acid (commonly known as sebacic acid), 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid. Of these, 1,6-hexanedicarboxylic acid, 1,7-heptanedicarboxylic acid, 1,8-octanedicarboxylic acid, 1,9-nonanedicarboxylic acid, and 1,10-decanedicarboxylic acid are preferred.

One linear aliphatic α,ω-dicarboxylic acid may be used alone, or two or more may be used in combination.

The linear aliphatic α,ω-diol(s) may be one(s) having a C3 to C14 alkylene group between the two hydroxy groups. Preferably, the number of carbon atoms in the alkylene group is 4 or more and 12 or less, more preferably 6 or more and 10 or less.

Examples of linear aliphatic α,ω-diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol. Of these, 1,6-hexanediol, 1,7-heptanediol, 1,8-octanediol, 1,9-nonanediol, and 1,10-decanediol are preferred.

One linear aliphatic α,ω-diol may be used alone, or two or more may be used in combination.

Preferably, the polymer, formed by linear aliphatic α,ω-dicarboxylic acid(s) and linear aliphatic α,ω-diol(s), is formed by at least one selected from the group consisting of 1,6-hexanedicarboxylic acid, 1,7-heptanedicarboxylic acid, 1,8-octanedicarboxylic acid, 1,9-nonanedicarboxylic acid, and 1,10-decanedicarboxylic acid and at least one selected from the group consisting of 1,6-hexanediol, 1,7-heptanediol, 1,8-octanediol, 1,9-nonanediol, and 1,10-decanediol, more preferably by 1,10-decanedicarboxylic acid and 1,6-hexanediol.

The crystalline polyester resin may constitute 1% by mass or more and 20% by mass or less of all binder resins. Preferably, the crystalline polyester resin constitutes 2% by mass or more and 15% by mass or less, more preferably 3% by mass or more and 10% by mass or less, of all binder resins.

Some characteristics of the crystalline resin may be as follows.

The melting temperature of the crystalline resin may be 50° C. or more and 100° C. or less. Preferably, the melting temperature is 55° C. or more and 90° C. or less, more preferably 60° C. or more and 85° C. or less.

This melting temperature is the "peak melting temperature" of the resin as in the methods for determining melting temperatures set forth in JIS K 7121: 1987 "Testing Methods for Transition Temperatures of Plastics" and is determined from the DSC curve of the resin, which is measured by differential scanning calorimetry (DSC).

The weight-average molecular weight (Mw) of the crystalline resin may be 6,000 or more and 35,000 or less.

The binder resin content may be 40% by mass or more and 95% by mass or less of the toner particles as a whole. Preferably, the binder resin content is 50% by mass or more and 90% by mass or less, more preferably 60% by mass or more and 85% by mass or less.

Coloring Agent

Examples of coloring agents include pigments, such as carbon black, chrome yellow, Hansa yellow, benzidine yellow, threne yellow, quinoline yellow, pigment yellow, permanent orange GTR, pyrazolone orange, Vulcan orange, Watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, Calco oil blue, methylene blue chloride, phthalocyanine blue, pigment blue, phthalocyanine green, and malachite green oxalate; and dyes, such as acridine, xanthene, azo, benzoquinone, azine, anthraquinone, thioindigo, dioxazine, thiazine, azomethine, indigo, phthalocyanine, aniline black, polymethine, triphenylmethane, diphenylmethane, and thiazole dyes.

One coloring agent may be used alone, or two or more may be used in combination.

Surface-treated coloring agents may optionally be used. A combination of a coloring agent and a dispersant may also be used. It is also possible to use multiple coloring agents in combination.

The coloring agent content may be 1% by mass or more and 30% by mass or less of the toner particles as a whole. Preferably, the coloring agent content is 3% by mass or more and 15% by mass or less.

For the colored toner particles, the coloring agent content may be 1% by mass or more and 30% by mass or less.

As for the transparent toner particles, the coloring agent content may be 0% by mass or more and 1% by mass or less.

Release Agent

Examples of release agents include hydrocarbon waxes; natural waxes, such as carnauba wax, rice wax, and candelilla wax; synthesized or mineral/petroleum waxes, such as montan wax; and ester waxes, such as fatty acid esters and montanates. Other release agents may also be used.

The melting temperature of the release agent may be 50° C. or more and 110° C. or less. Preferably, the melting temperature is 60° C. or more and 100° C. or less.

The melting temperature of the release agent is the "peak melting temperature" of the agent as in the methods for determining melting temperatures set forth in JIS K 7121: 1987 "Testing Methods for Transition Temperatures of Plastics" and is determined from the DSC curve of the agent, which is measured by differential scanning calorimetry (DSC).

The release agent content may be 1% by mass or more and 20% by mass or less of the toner particles as a whole. Preferably, the release agent content is 5% by mass or more and 15% by mass or less.

Other Additives

Examples of other additives include known additives, such as magnetic substances, charge control agents, and inorganic powders. Such additives, if used, are contained in the toner particles as internal additives.

Structure of the Toner Particles

The toner particles may be single-layer toner particles or may be "core-shell" toner particles, i.e., toner particles formed by a core (core particle) and a coating that covers the core (shell layer).

A possible structure of core-shell toner particles is one in which the core contains the binder resin together with the coloring agent, release agent, and/or other additives if used, and the coating contains the binder resin.

External Additives

An example of an external additive is inorganic particles. Examples of inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O\ (TiO_2)_n$, $Al_2O_3 \cdot 2SiO_2$, $CaCO_3$, $MgCO_3$, $BaSO_4$, and $MgSO_4$.

The surface of the inorganic particles may be hydrophobic, for example as a result of being immersed in a hydrophobizing agent. The hydrophobizing agent can be of any kind, but examples include silane coupling agents, silicone oil, titanate coupling agents, and aluminum coupling agents. One such agent may be used alone, or two or more may be used in combination. The amount of the hydrophobizing agent is usually, for example, 1 part by mass or more and 10 parts by mass or less per 100 parts by mass of the inorganic particles.

Materials like resin particles (particles of polystyrene, polymethyl methacrylate, melamine resins, etc.) and active cleaning agents (e.g., metal salts of higher fatty acids, typically zinc stearate, and particles of fluoropolymers) are also examples of external additives.

The percentage of external additives may be 0.01% by mass or more and 5% by mass or less of the toner particles. Preferably, this percentage is 0.01% by mass or more and 2.0% by mass or less.

Production of the Toner

Toner according to this exemplary embodiment can be obtained by producing the toner particles and then adding external additives.

The toner particles can be produced either by a dry process (e.g., kneading and milling) or by a wet process (e.g., aggregation and coalescence, suspension polymerization, or dissolution and suspension). Any known dry or wet process may be used to produce the toner particles.

The following describes an example of how to produce the toner particles by kneading and milling by way of example.

Kneading and milling is a process for producing toner particles in which, for example, binder resins including amorphous and crystalline resins and a coloring agent are melted and kneaded together, the kneaded mixture is milled, and then the milled product is classified. The process includes, for example, kneading, in which ingredients including binder resins and a coloring agent are melted and kneaded together; cooling, in which the molten mixture is cooled; milling, in which the cooled mixture is milled; and classification, in which the milled product is classified.

In this process of kneading and milling, the milling is carried out after domains of crystalline resin have grown large in the kneaded mixture. This ensures the finished toner particles will include colored and transparent toner particles.

If there are well grown domains of crystalline resin in the kneaded mixture when it is milled, the milling will break the mixture at the crystalline-resin domains. The product, therefore, will contain many domains of crystalline resin. Since crystalline resins and coloring agents are incompatible, the coloring agent will prefer to be present in the amorphous resin. In the portion of the milled product containing many domains of crystalline resin, therefore, there will be little coloring agent.

That is, part of the milled product will contain a large amount of coloring agent, and the rest will contain little or no coloring agent.

In consequence, the resulting toner particles will include colored and transparent toner particles.

The following describes the details of kneading-and-milling production of the toner particles.

Kneading

Ingredients including binder resins and a coloring agent are melted and kneaded together. The binder resins include amorphous and crystalline resins.

Examples of kneaders that can be used include three-roll, single-screw, twin-screw, and Banbury-mixer kneaders.

The temperature at which the materials are melted can be determined according to the binder resins and coloring agent used, their proportions, etc.

Cooling

The kneaded mixture is then cooled.

For example, the mixture is cooled from its temperature at the end of kneading to 40° C. or below at an average rate of 10° C./sec or slower. This may help domains of crystalline resin grow well in the kneaded mixture.

The average rate in this context is the average speed of cooling of the kneaded mixture from its temperature at the end of kneading to 40° C.

An example of a method for cooling is the use of a combination of rollers and a belt therebeneath with circulating cold water or brine. If this method is used, the rate of cooling is determined by the speed of the rollers, the flow rate of the water or brine, the supply rate of the kneaded mixture, the thickness of the slab on which the mixture is rolled, etc.

Milling

The cooled mixture is then milled into particles, for example using a mechanical mill or jet mill.

Before being milled, the mixture may be warmed to a temperature not exceeding the melting point of the crystalline resin (below the melting temperature of the crystalline resin; e.g., the melting temperature minus 10° C.). This may help domains of crystalline resin grow well in the mixture.

Classification

The milled product (particles) may optionally be classified to give the toner particles the desired average diameter.

A centrifugal, inertial, or any other commonly used classifier is used to eliminate undersized powder (particles smaller than the desired range of diameters) and oversized powder (particles larger than the desired range of diameters).

Hot-Air Blow

The classified particles may be blown with hot air to give the toner particles the desired circularity.

In this way, toner particles including colored and transparent toner particles are obtained.

It should be noted that this is not the only possible process for producing the toner particles. The toner particles may be produced by preparing separate collections of colored and transparent toner particles by an ordinary method and then mixing them together.

Then toner according to this exemplary embodiment is produced, for example by adding external additives while the toner particles are dry, and mixing them together. The mixing can be performed using, for example, a V-blender, Henschel mixer, or Lödige mixer. Optionally, oversized particles of toner may be removed, for example using a vibrating sieve or air-jet sieve.

Electrostatic Charge Image Developer

An electrostatic charge image developer according to an exemplary embodiment contains at least toner according to the above exemplary embodiment.

The electrostatic charge image developer according to this exemplary embodiment may be a one-component developer, which is substantially toner according to the above exemplary embodiment, or may be a two-component developer, which is a mixture of the toner and a carrier.

The carrier can be of any kind and can be a known one. Examples include a coated carrier, formed by a core magnetic powder and a coating resin on its surface; a magnetic powder-dispersed carrier, formed by a matrix resin and a magnetic powder dispersed therein; and a resin-impregnated carrier, which is a porous magnetic powder impregnated with resin.

The particles as a component of a magnetic powder-dispersed or resin-impregnated carrier can serve as the core material; a carrier obtained by coating the surface of them with resin may also be used.

The magnetic powder can be, for example, a powder of a magnetic metal, such as iron, nickel, or cobalt, or a powder of a magnetic oxide, such as ferrite or magnetite.

The coating or matrix resin can be, for example, polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, a straight silicone resin (resin having organosiloxane bonds) or its modified form, a fluoropolymer, polyester, polycarbonate, a phenolic resin, or an epoxy resin.

The coating or matrix resin may contain additives, such as electrically conductive particles.

Examples of electrically conductive particles include particles of metal, such as gold, silver, or copper, and particles of carbon black, titanium oxide, zinc oxide, tin oxide, barium sulfate, aluminum borate, and potassium titanate.

The resin coating of the surface of the core material can be achieved by, for example, coating the surface with a coating-layer solution prepared by dissolving the coating resin in a solvent, optionally with additives. The solvent can be of any kind and can be selected considering, for example, the coating resin used and suitability for coating.

Specific examples of how to provide the resin coating include dipping, i.e., immersing the core material in the coating-layer solution; spraying, i.e., applying a mist of the coating-layer solution onto the surface of the core material; fluidized bed coating, i.e., applying a mist of the coating-layer solution to core material floated on a stream of air; and kneader-coater coating, i.e., mixing the carrier core material and the coating-layer solution in a kneader-coater and removing the solvent.

If the developer is two-component, the mix ratio (by mass) between the toner and the carrier may be between 1:100 (toner:carrier) and 30:100. Preferably, the mix ratio is between 3:100 and 20:100.

Image Forming Apparatus/Image Forming Method

The following describes an image forming apparatus/image forming method according to an exemplary embodiment.

An image forming apparatus according to this exemplary embodiment includes an image carrier; a charging component that charges the surface of the image carrier; an electrostatic charge image creating component that creates an electrostatic charge image on the charged surface of the image carrier; a developing component that contains an electrostatic charge image developer and develops, using the electrostatic charge image developer, the electrostatic charge image on the surface of the image carrier to form a toner image; a transfer component that transfers the toner image on the surface of the image carrier to the surface of a recording medium; and a fixing component that fixes the toner image on the surface of the recording medium. The electrostatic charge image developer is an electrostatic charge developer according to the above exemplary embodiment.

The image forming apparatus according to this exemplary embodiment performs an image forming method that includes charging the surface of an image carrier; creating an electrostatic charge image on the charged surface of the image carrier; developing, using an electrostatic charge image developer according to the above exemplary embodiment, the electrostatic charge image on the surface of the image carrier to form a toner image; transferring the toner image on the surface of the image carrier to the surface of a recording medium; and fixing the toner image on the surface of the recording medium (image forming method according to this exemplary embodiment).

The configuration of the image forming apparatus according to this exemplary embodiment can be applied to well-known types of image forming apparatuses. Examples include a direct-transfer image forming apparatus, which forms a toner image on the surface of an image carrier and transfers it directly to a recording medium; an intermediate-transfer image forming apparatus, which forms a toner image on the surface of an image carrier, transfers it to the surface of an intermediate transfer body (first transfer), and then transfers the toner image on the surface of the intermediate transfer body to the surface of a recording medium (second transfer); an image forming apparatus having a cleaning component that cleans the surface of the image carrier between the transfer of the toner image and charging; and an image forming apparatus having a static eliminator that removes static electricity from the surface of the image carrier by irradiating the surface with antistatic light between the transfer of the toner image and charging.

The transfer component of an intermediate-transfer apparatus may include, for example, an intermediate transfer body, a first transfer component, and a second transfer component. The toner image formed on the surface of the image carrier is transferred to the surface of the intermediate transfer body by the first transfer component (first transfer), and then the toner image on the surface of the intermediate transfer body is transferred to the surface of a recording medium by the second transfer component (second transfer).

Part of the image forming apparatus according to this exemplary embodiment, e.g., a portion including the developing component, may have a cartridge structure, i.e., a structure that allows the part to be detached from and attached to the image forming apparatus (or may be a process cartridge). An example of a process cartridge is one that includes a developing component that contains an electrostatic charge image developer according to the above exemplary embodiment.

The following describes an example of an image forming apparatus according to this exemplary embodiment. This is not the only possible form. Some of its structural elements are described with reference to a drawing.

FIG. 1 is a schematic view of the structure of an image forming apparatus according to this exemplary embodiment.

The image forming apparatus illustrated in FIG. 1 includes first to fourth electrophotographic image forming units 10Y, 10M, 10C, and 10K (image forming component) that produce images in the colors of yellow (Y), magenta (M), cyan (C), and black (K), respectively, based on color-separated image data. These image forming units (hereinafter also referred to simply as "units") 10Y, 10M, 10C, and 10K are arranged in a horizontal row with a predetermined distance therebetween. The units 10Y, 10M, 10C, and 10K may be process cartridges, i.e., units that can be detached from and attached to the image forming apparatus.

Above the units 10Y, 10M, 10C, and 10K in the drawing, an intermediate transfer belt 20 as an intermediate transfer body extends to pass through each of the units. The intermediate transfer belt 20 is wound over a drive roller 22 (right in the drawing) and a support roller 24 (left in the drawing) spaced apart from each other, with the rollers touching the inner surface of the intermediate transfer belt 20, and is driven by them to run in the direction from the first unit 10Y to the fourth unit 10K. The support roller 24 is forced by a spring or similar mechanism, not illustrated in the drawing, to go away from the drive roller 22, thereby placing tension on the intermediate transfer belt 20 wound over the two rollers. On the image-carrying side of the intermediate transfer belt 20 is a cleaning device 30 for the intermediate transfer belt 20 facing the drive roller 22.

The units 10Y, 10M, 10C, and 10K have developing devices (developing component) 4Y, 4M, 4C, and 4K, to which four toners in the colors of yellow, magenta, cyan, and black, respectively, are delivered from toner cartridges 8Y, 8M, 8C, and 8K.

The first to fourth units 10Y, 10M, 10C, and 10K are equivalent in structure. In the following, the first unit 10Y, located upstream of the others in the direction of running of the intermediate transfer belt 20 and forms a yellow image, is described to represent the four units. The second to fourth units 10M, 10C, and 10K are not described; they have structural elements equivalent to those of the first unit 10Y, and these elements are designated with the same numerals as in the first unit 10Y but with the letters M (for magenta), C (for cyan), and K (for black), respectively, in place of Y (for yellow).

The first unit 10Y has a photoreceptor 1Y that acts as an image carrier. Around the photoreceptor 1Y are a charging roller (example of a charging component) 2Y that charges the surface of the photoreceptor 1Y to a predetermined potential; an exposure device (example of an electrostatic charge image creating component) 3 that irradiates the charged surface with a laser beam 3Y produced on the basis of a color-separated image signal to create an electrostatic charge image there; a developing device (example of a developing component) 4Y that supplies charged toner to the electrostatic charge image to develop the electrostatic charge image; a first transfer roller (example of a first transfer component) 5Y that transfers the developed toner image to the intermediate transfer belt 20; and a photoreceptor cleaning device (example of a cleaning component) 6Y that removes residual toner off the surface of the photoreceptor 1Y after the first transfer, arranged in this order.

The first transfer roller 5Y is inside the intermediate transfer belt 20 and faces the photoreceptor 1Y. Each of the first transfer rollers 5Y, 5M, 5C, and 5K is connected to a bias power supply (not illustrated) that applies a first transfer bias to the roller. Each bias power supply is controlled by a controller, not illustrated in the drawing, to change the magnitude of the transfer bias it applies to the corresponding first transfer roller.

The operation of forming a yellow image at the first unit 10Y may be as described below.

First, before the operation, the charging roller 2Y charges the surface of the photoreceptor 1Y to a potential of −600 V to −800 V.

The photoreceptor 1Y is a stack of an electrically conductive substrate (e.g., having a volume resistivity at 20° C. of $1\times10^{-6}$ Ωcm or less) and a photosensitive layer thereon. The photosensitive layer is of high electrical resistance (has the typical resistance of resin) in its normal state, but when it is irradiated with a laser beam 3Y, the resistivity of the irradiated portion changes. Thus, a laser beam 3Y is emitted using the exposure device 3 onto the charged surface of the photoreceptor 1Y in accordance with data for the yellow image sent from a controller, not illustrated in the drawing. The laser beam 3Y hits the photosensitive layer on the surface of the photoreceptor 1Y, creating an electrostatic charge image as a pattern for the yellow image on the surface of the photoreceptor 1Y.

The electrostatic charge image is an image created on the surface of the photoreceptor 1Y by electrical charging and is a so-called negative latent image, created after the charge on the surface of the photoreceptor 1Y flows away in the irradiated portion of the photosensitive layer as a result of a resistivity decrease caused by the exposure to the laser beam 3Y but stays in the portion of the photosensitive layer not irradiated with the laser beam 3Y.

As the photoreceptor 1Y rotates, the electrostatic charge image created on the photoreceptor 1Y is moved to a predetermined development point. At this development point, the electrostatic charge image on the photoreceptor 1Y is visualized (developed) as a toner image by the developing device 4Y.

Inside the developing device 4Y is an electrostatic charge image developer that contains, for example, at least yellow toner and a carrier. The yellow toner is on a developer roller (example of a developer carrier) and has been triboelectrically charged with the same polarity as the charge on the photoreceptor 1Y (negative) as a result of being stirred inside the developing device 4Y. As the surface of the photoreceptor 1Y passes through the developing device 4Y, the yellow toner electrostatically adheres to the uncharged, latent-image portion of the surface of the photoreceptor 1Y and develops the latent image. The photoreceptor 1Y, now having a yellow toner image thereon, then continues rotating at a predetermined speed, transporting the toner image developed thereon to a predetermined first transfer point.

After the arrival of the yellow toner image on the photoreceptor 1Y at the first transfer point, a first transfer bias is applied to the first transfer roller 5Y. An electrostatic force acts on the toner image in the direction from the photoreceptor 1Y toward the first transfer roller 5Y, causing the toner image to be transferred from the photoreceptor 1Y to the intermediate transfer belt 20. The applied transfer bias has the (+) polarity, opposite the polarity of the toner (−), and its amount has been controlled by a controller (not illustrated). For the first unit 10Y, for example, it has been controlled to +10 μA.

Residual toner on the photoreceptor 1Y is removed and collected at the photoreceptor cleaning device 6Y.

The first transfer biases applied to the first transfer rollers 5M, 5C, and 5K of the second, third, and fourth units 10M, 10C, and 10K have also been controlled in the same way as that at the first unit 10Y.

The intermediate transfer belt 20 to which a yellow toner image has been transferred at the first unit 10Y in this way is then transported passing through the second to fourth units 10M, 10C, and 10K sequentially. Toner images in the respective colors are overlaid, completing multilayer transfer.

The intermediate transfer belt 20 that has passed through the first to fourth units and thereby completed multilayer transfer of toner images in four colors then reaches a second transfer section. The second transfer section is formed by the intermediate transfer belt 20, the support roller 24, which touches the inner surface of the intermediate transfer belt 20, and a second transfer roller (example of a second transfer component) 26, which is on the image-carrying side of the intermediate transfer belt 20. Recording paper (example of a recording medium) P is fed to the point of contact between the second transfer roller 26 and the intermediate transfer belt 20 in a timed manner by a feeding mechanism, and a second transfer bias is applied to the support roller 24. The applied transfer bias has the (−) polarity, the same as the polarity of the toner (−). An electrostatic force acts on the toner image in the direction from the intermediate transfer belt 20 toward the recording paper P, causing the toner image to be transferred from the intermediate transfer belt 20 to the recording paper P. The amount of the second transfer bias has been controlled and is determined in accordance with the resistance detected by a resistance detector (not illustrated) that detects the electrical resistance of the second transfer section.

After that, the recording paper P is sent to the point of pressure contact (nip) between a pair of fixing rollers at a fixing device (example of a fixing component) 28. The toner image is fixed on the recording paper P there, giving a fixed image.

The recording paper P to which the toner image is transferred can be, for example, a piece of ordinary printing paper for copiers, printers, etc., of electrophotographic type. Recording media such as overhead-projector (OHP) sheets may also be used.

The use of recording paper P having a smooth surface may help further improve the smoothness of the surface of the fixed image. For example, coated paper, which is paper with a coating, for example of resin, on its surface, or art paper for printing may be used.

The recording paper P with a completely fixed color image thereon is transported to an ejection section to finish the formation of a color image.

Process Cartridge/Toner Cartridge

The following describes a process cartridge according to an exemplary embodiment.

A process cartridge according to this exemplary embodiment includes a developing component that contains an electrostatic charge image developer according to an above exemplary embodiment and develops, using the electrostatic charge image developer, an electrostatic charge image created on the surface of an image carrier to form a toner image. The process cartridge can be attached to and detached from an image forming apparatus.

This is not the only possible configuration of a process cartridge according to this exemplary embodiment. Besides the developing component, the process cartridge may optionally have at least one extra component selected from an image carrier, a charging component, an electrostatic charge image creating component, a transfer component, etc.

The following describes an example of a process cartridge according to this exemplary embodiment. This is not the only possible form. The following describes some of its structural elements with reference to a drawing.

Figure 2:
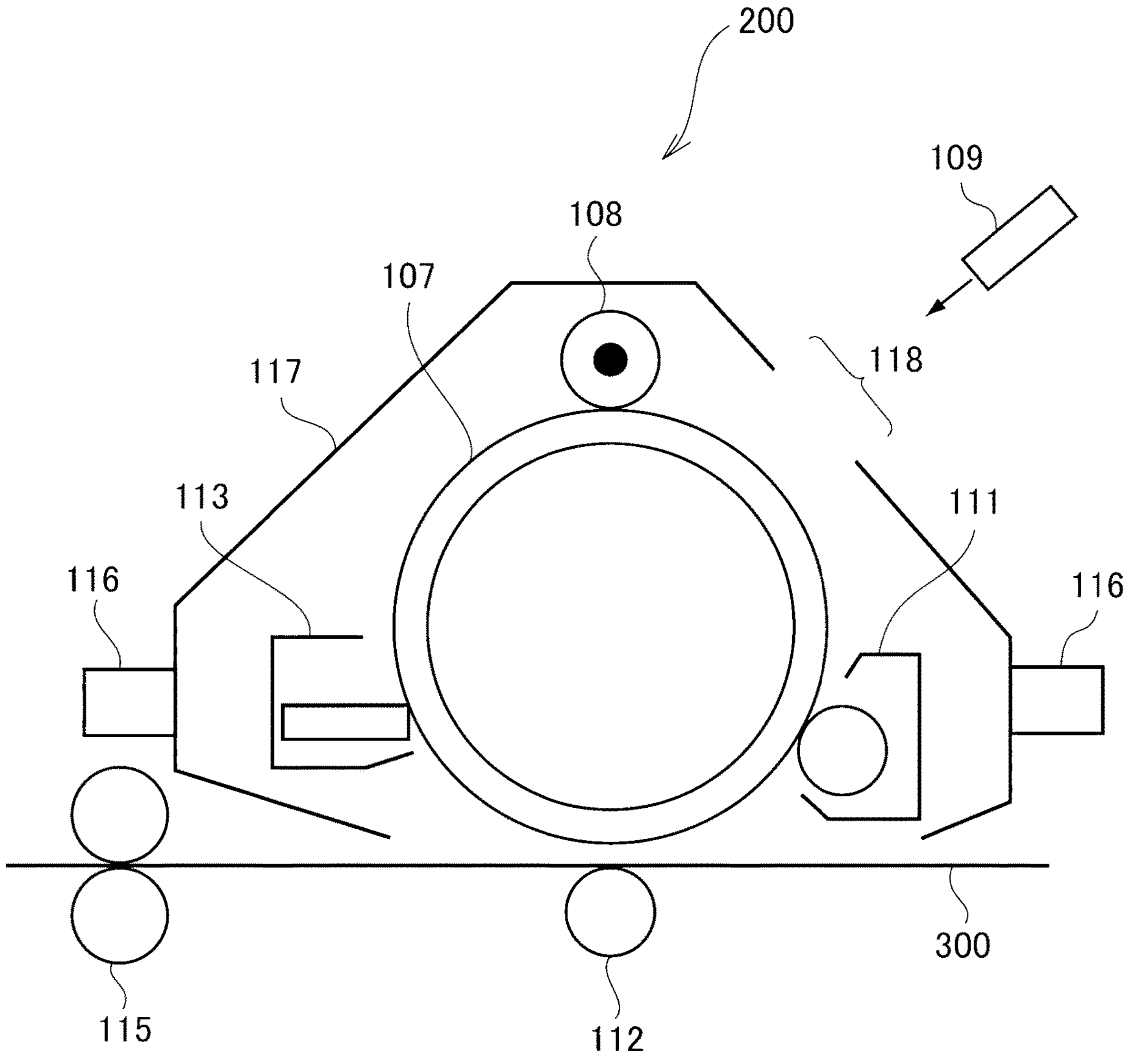
FIG. 2 is a schematic view of the structure of an example of a process cartridge according to an exemplary embodiment that is attached to and detached from an image forming apparatus.

FIG. 2 is a schematic view of the structure of a process cartridge according to this exemplary embodiment.

The process cartridge 200 illustrated in FIG. 2 is a cartridge formed by, for example, a housing 117 and components held together therein. The housing 117 has attachment rails 116 and an opening 118 for exposure to light. The components inside the housing 117 include a photoreceptor 107 (example of an image carrier) and a charging roller 108 (example of a charging component), a developing device 111 (example of a developing component), and a photoreceptor cleaning device 113 (example of a cleaning component) disposed around the photoreceptor 107.

FIG. 2 also illustrates an exposure device (example of an electrostatic charge image creating component) 109, a transfer device (example of a transfer component) 112, a fixing device (example of a fixing component) 115, and recording paper (example of a recording medium) 300.

The following describes a toner cartridge according to this exemplary embodiment.

A toner cartridge according to this exemplary embodiment contains toner according to an above exemplary embodiment and can be attached to and detached from an image forming apparatus. A toner cartridge is a cartridge that stores replenishment toner for a developing component placed inside an image forming apparatus.

The image forming apparatus illustrated in FIG. 1 has toner cartridges 8Y, 8M, 8C, and 8K that can be attached to and detached from it. The developing devices 4Y, 4M, 4C, and 4K are connected to their corresponding toner cartridges (or the toner cartridges for their respective colors) by toner feed tubing, not illustrated in the drawing. When there is little toner in a toner cartridge, this toner cartridge is replaced.

EXAMPLES

The following describes exemplary embodiments of the present disclosure in further detail by providing examples, but the exemplary embodiments of the present disclosure are not limited to these examples. In the following description, "parts" and "%" are by mass unless stated otherwise.

Synthesis of Amorphous Polyester Resin (A1)

Terephthalic acid: 68 parts
Fumaric acid: 32 parts
Ethylene glycol: 42 parts
1,5-Pentanediol: 47 parts These materials are put into a flask equipped with a stirrer, a nitrogen inlet tube, a temperature sensor, and a rectifying column. With a nitrogen stream into the flask, the temperature is increased to 220° C. over 1 hour. One part of titanium tetraethoxide is added to a total of 100 parts of the above materials. The temperature is increased to 240° C. over 0.5 hours while water is removed by distillation as it is formed. After 1 hour of dehydration condensation at 240° C., the reaction product is cooled. The resulting resin is amorphous polyester resin (A1). Its weight-average molecular weight is 97000, and its glass transition temperature is 60° C.

Production of Crystalline Polyester Resin (B1)

1,10-Decanedicarboxylic acid: 260 parts
1,6-Hexanediol: 167 parts
Dibutyltin oxide (catalyst): 0.3 parts These materials are put into a three-neck flask dried by heating. After the air in the flask is replaced with nitrogen gas to create an inert atmosphere, the materials are stirred under reflux for 5 hours at 180° C. by mechanical stirring. Then the resulting mixture is heated to 230° C. gently and stirred for 2 hours under reduced pressure. The thickened mixture is air-cooled to terminate the reaction, giving a crystalline polyester resin. Its weight-average molecular weight is 12500, and its melting temperature is 73° C.

Production of Crystalline Polyester Resin (B2)

1,16-Hexadecanedicarboxylic acid: 260 parts
1,14-Tetradecanediol: 190 parts
Dibutyltin oxide (catalyst): 0.3 parts These materials are put into a three-neck flask dried by heating. After the air in the flask is replaced with nitrogen gas to create an inert atmosphere, the materials are stirred under reflux for 6 hours at 180° C. by mechanical stirring. Then the resulting mixture is heated to 230° C. gently and stirred for 3 hours under reduced pressure. The thickened mixture is air-cooled to terminate the reaction, giving a crystalline polyester resin. Its weight-average molecular weight is 25000, and its melting temperature is 112° C.

Production of Crystalline Polyester Resin (B3)

1,12-Dodecanedicarboxylic acid: 252 parts
1,12-Dodecanediol: 198 parts
Dibutyltin oxide (catalyst): 0.3 parts These materials are put into a three-neck flask dried by heating. After the air in the flask is replaced with nitrogen gas to create an inert atmosphere, the materials are stirred under reflux for 6 hours at 180° C. by mechanical stirring. Then the resulting mixture is heated to 230° C. gently and stirred for 2.5 hours under reduced pressure. The thickened mixture is air-cooled to terminate the reaction, giving a crystalline polyester resin. Its weight-average molecular weight is 18000, and its melting temperature is 105° C.

Production of Crystalline Polyester Resin (B4)

Sebacic acid: 284 parts
1,6-Hexanediol: 166 parts
Dibutyltin oxide (catalyst): 0.3 parts These materials are put into a three-neck flask dried by heating. After the air in the flask is replaced with nitrogen gas to create an inert atmosphere, the materials are stirred under reflux for 6 hours at 180° C. by mechanical stirring. Then the resulting mixture is heated to 230° C. gently and stirred for 2.5 hours under reduced pressure. The thickened mixture is air-cooled to terminate the reaction, giving a crystalline polyester resin. Its weight-average molecular weight is 10000, and its melting temperature is 63° C.

Production of Crystalline Polyester Resin (B5)

Adipic acid: 249 parts
1,6-Hexanediol: 201 parts
Dibutyltin oxide (catalyst): 0.3 parts These materials are put into a three-neck flask dried by heating. After the air in the flask is replaced with nitrogen gas to create an inert atmosphere, the materials are stirred under reflux for 6 hours at 180° C. by mechanical stirring. Then the resulting mixture is heated to 230° C. gently and stirred for 2.5 hours under reduced pressure. The thickened mixture is air-cooled to terminate the reaction, giving a crystalline polyester resin. Its weight-average molecular weight is 8000, and its melting temperature is 54° C.

Example 1

- Amorphous polyester resin (A1): 65 parts
- Crystalline polyester resin (B1): 23 parts
- A coloring agent (carbon black; Mitsubishi Chemical #25): 7 parts
- A release agent (paraffin wax; Nippon Seiro HNP 9): 5 parts These materials are mixed together in a Henschel mixer (FM75L, Nippon Coke & Engineering), the resulting mixture is kneaded through a twin-screw extruder (TEM-48SS, Shibaura Machine), and the kneaded mixture is rolled and cooled. The average rate of cooling is set to 5° C./s by adjusting the supply rate the kneaded mixture and the flow rate of cooling water to ensure it will take 30 seconds or more for the surface of the mixture to be cooled to 40° C. The cooled mixture is shredded in a hammer mill, and the resulting grains are stored in a temperature-controlled chamber at 50° C. for 24 hours. The stored grains are pulverized in a jet mill (AFG, Hosokawa Micron), and the resulting particles are classified using an elbow-jet classifier (EJ-LABO, Nittetsu Mining). The parameters are customized so that the Dn will be 5.0 μm. The classified particles are blown with hot air at 150° C. The resulting particles are toner particles 1.

- Toner particles 1: 100 parts
- Sol-gel silica particles (number-average diameter=120 nm): 2.0 parts
- Strontium titanate particles (number-average diameter=50 nm): 0.2 parts These materials are mixed together in a Henschel mixer. The product is toner 1.

Example 2

Production of Toner Particles 2-1

- Amorphous polyester resin (A1): 68 parts
- Crystalline polyester resin (B1): 20 parts
- A coloring agent (carbon black; Mitsubishi Chemical #25): 7 parts
- A release agent (paraffin wax; Nippon Seiro HNP 9): 5 parts These materials are mixed together in a Henschel mixer (FM75L, Nippon Coke & Engineering), the resulting mixture is kneaded through a twin-screw extruder (TEM-48SS, Shibaura Machine), and the kneaded mixture is rolled and cooled. The average rate of cooling is set to 10° C./s by adjusting the supply rate the kneaded mixture and the flow rate of cooling water to ensure it will take 10 seconds or less for the surface of the mixture to be cooled to 40° C. The cooled mixture is shredded in a hammer mill, and the resulting grains are stored in a temperature-controlled chamber at 20° C. for 12 hours. The stored grains are pulverized in a jet mill (AFG, Hosokawa Micron), and the resulting particles are classified using an elbow-jet classifier (EJ-LABO, Nittetsu Mining). The parameters are customized so that the Dn will be 5.0 μm. The classified particles are blown with hot air at 150° C. The resulting particles are toner particles 2-1.

Production of Toner Particles 2-2

- Amorphous polyester resin (A1): 30 parts
- Crystalline polyester resin (B1): 65 parts
- A release agent (paraffin wax; Nippon Seiro HNP 9): 5 parts These materials are mixed together in a Henschel mixer (FM75L, Nippon Coke & Engineering), the resulting mixture is kneaded through a twin-screw extruder (TEM-48SS, Shibaura Machine), and the kneaded mixture is rolled and cooled. The average rate of cooling is set to 10° C./s by adjusting the supply rate the kneaded mixture and the flow rate of cooling water to ensure it will take 10 seconds or less for the surface of the mixture to be cooled to 40° C. The cooled mixture is shredded in a hammer mill, and the resulting grains are stored in a temperature-controlled chamber at 20° C. for 12 hours. The stored grains are pulverized in a jet mill (AFG, Hosokawa Micron), and the resulting particles are classified using an elbow-jet classifier (EJ-LABO, Nittetsu Mining). The parameters are customized so that the Dn will be 4.0 μm. The classified particles are blown with hot air at 150° C. The resulting particles are toner particles 2-2.

Production of Toner 2

- Toner particles 2-1: 94 parts
- Toner particles 2-2: 6 parts
- Sol-gel silica particles (number-average diameter=120 nm): 2.0 parts
- Strontium titanate particles (number-average diameter=50 nm): 0.2 parts These materials are mixed together in a Henschel mixer. The product is toner 2.

Example 3

Toner is obtained in the same way as in Example 1 except that the average rate of cooling of the kneaded mixture is changed to 6° C./s. The resulting toner is toner 3.

Example 4

Toner is obtained in the same way as in Example 1 except that the average rate of cooling of the kneaded mixture is changed to 4° C./s. The resulting toner is toner 4.

Example 5

Toner is obtained in the same way as in Example 1 except that the amount of amorphous polyester resin (A1) and that of crystalline polyester resin (B1) are changed to 80 parts and 8 parts, respectively. The resulting toner is toner 5.

Example 6

Toner is obtained in the same way as in Example 2 except that in the production of toner 2, the quantity of toner particles 2-1 and that of toner particles 2-2 are changed to 90.2 parts and 9.8 parts, respectively. The resulting toner is toner 6.

Example 7

Toner is obtained in the same way as in Example 2 except that in the production of toner particles 2-2, the classification parameters are customized so that the Dn will be 3.5 μm. The resulting toner is toner 7.

Example 8

Toner is obtained in the same way as in Example 2 except that the temperature of hot air blow in the production of toner particles 2-2 is changed to 100° C. The resulting toner is toner 8.

Example 9

Toner is obtained in the same way as in Example 2 except that the temperature of hot air blow in the production of toner particles 2-2 is changed to 130° C. The resulting toner is toner 9.

Example 10

Toner is obtained in the same way as in Example 2 except that the temperature of hot air blow in the production of toner particles 2-2 is changed to 140° C. The resulting toner is toner 10.

Example 11

Toner is obtained in the same way as in Example 1 except that the temperature of hot air blow is changed to 130° C. The resulting toner is toner 11.

Example 12

Toner is obtained in the same way as in Example 1 except that the temperature of hot air blow is changed to 135° C. The resulting toner is toner 12.

Example 13

Toner is obtained in the same way as in Example 1 except that the temperature of hot air blow is changed to 160° C. The resulting toner is toner 13.

Example 14

Toner is obtained in the same way as in Example 1 except that the temperature of hot air blow is changed to 165° C. The resulting toner is toner 14.

Example 15

Toner is obtained in the same way as in Example 1 except that crystalline polyester resin (B1) is replaced with crystalline polyester resin (B5). The resulting toner is toner 15.

Example 16

Toner is obtained in the same way as in Example 1 except that crystalline polyester resin (B1) is replaced with crystalline polyester resin (B4). The resulting toner is toner 16.

Example 17

Toner is obtained in the same way as in Example 1 except that crystalline polyester resin (B1) is replaced with crystalline polyester resin (B3). The resulting toner is toner 17.

Example 18

Toner is obtained in the same way as in Example 1 except that crystalline polyester resin (B1) is replaced with crystalline polyester resin (B2). The resulting toner is toner 18.

Example 19

Toner is obtained in the same way as in Example 2 except for the following changes: In the production of toner particles 2-1, the amount of amorphous polyester resin (A1) and that of crystalline polyester resin (B1) are changed to 43 parts and 45 parts, respectively, and the temperature of hot air blow is changed to 140° C. In the production of toner particles 2-2, the amount of amorphous polyester resin (A1) and that of crystalline polyester resin (B1) are changed to 44 parts and 51 parts, respectively. The resulting toner is toner 19.

Example 20

Toner is obtained in the same way as in Example 2 except for the following changes: In the production of toner particles 2-1, the amount of amorphous polyester resin (A1) and that of crystalline polyester resin (B1) are changed to 48 parts and 40 parts, respectively, and the temperature of hot air blow is changed to 140° C. In the production of toner particles 2-2, the amount of amorphous polyester resin (A1) and that of crystalline polyester resin (B1) are changed to 44 parts and 51 parts, respectively. The resulting toner is toner 20.

Example 21

Toner is obtained in the same way as in Example 2 except for the following changes: In the production of toner particles 2-1, the amount of amorphous polyester resin (A1) and that of crystalline polyester resin (B1) are changed to 73.1 parts and 14.9 parts, respectively. In the production of toner particles 2-2, the amount of amorphous polyester resin (A1) and that of crystalline polyester resin (B1) are changed to 50 parts and 45 parts, respectively. The resulting toner is toner 21.

Example 22

Toner is obtained in the same way as in Example 2 except for the following changes: In the production of toner particles 2-1, the amount of amorphous polyester resin (A1) and that of crystalline polyester resin (B1) are changed to 71 parts and 17 parts, respectively. In the production of toner particles 2-2, the amount of amorphous polyester resin (A1) and that of crystalline polyester resin (B1) are changed to 43 parts and 52 parts, respectively. The resulting toner is toner 22.

Example 23

Toner is obtained in the same way as in Example 2 except for the following changes: In the production of toner particles 2-1, the amount of amorphous polyester resin (A1) and that of crystalline polyester resin (B1) are changed to 62.5 parts and 25.5 parts, respectively. In the production of toner particles 2-2, the amount of amorphous polyester resin (A1) and that of crystalline polyester resin (B1) are changed to 17 parts and 78 parts, respectively. The resulting toner is toner 23.

Example 24

Toner is obtained in the same way as in Example 2 except for the following changes: In the production of toner particles 2-1, the amount of amorphous polyester resin (A1) and that of crystalline polyester resin (B1) are changed to 61 parts and 27 parts, respectively. In the production of toner particles 2-2, the amount of amorphous polyester resin (A1) and that of crystalline polyester resin (B1) are changed to 13 parts and 82 parts, respectively. The resulting toner is toner 24.

Comparative Example 1

Toner is obtained in the same way as in Example 1 except that the amount of amorphous polyester resin (A1) and that of crystalline polyester resin (B1) are changed to 67 parts and 21 parts, respectively, and that the average rate of cooling of the kneaded mixture is changed to 15° C./s. The resulting toner is toner C1.

Comparative Example 2

Toner is obtained in the same way as in Example 2 except that in the production of toner 2, the quantity of toner particles 2-1 and that of toner particles 2-2 are changed to 88 parts and 12 parts, respectively. The resulting toner is toner C2.

Comparative Example 3

Toner is obtained in the same way as in Example 2 except that in the production of toner particles 2-2, the classification parameters are customized so that the Dn will be 3.3 μm. The resulting toner is toner C3.

Testing

Characterization

The following characteristics of the toners of Examples and Comparative Examples are measured as described above.

- Number-average diameter Dn of toner particles ("Particle diameter Dn" in the table)
- Percentage of transparent toner particles to all toner particles (simply "Percentage" in the table)
- Percentage, in the size distribution of transparent toner particles, of toner particles having a diameter equal to or smaller than the number-average diameter Dn of all toner particles ("Percentage of ≤Dn particles" in the table)
- Average circularity Cf of colored toner particles ("Circularity Cf" in the table)
- Average circularity Cs of transparent toner particles ("Circularity Cs" in the table)
- Relative area Sf of crystalline-resin domains to the particle cross-sectional area in colored toner particles ("Relative area Sf of crystalline resin" in the table)
- Relative area Ss of crystalline-resin domains to the particle cross-sectional area in transparent toner particles ("Relative area Ss of crystalline resin" in the table)

Variability in Gloss

Developers for the image forming apparatus below are prepared with the toners of Examples and Comparative Examples.

With each of the developers, a 4 cm×4 cm solid image is printed continuously on 50 postcards under 8° C. conditions using a developing device of Fuji Xerox's DocuPrint 4400d image forming apparatus. The amount of toner is set to 5 g/m$^2$.

The 60° gloss of the image on the 50th postcard is measured using a handheld gloss meter (BYK Gardner Micro-TRI-Gloss, Toyo Seiki Seisaku-sho).

The gloss is measured in a total of five areas of the solid image, namely the front left, front right, back left, back right, and center (the front being the side that faces forward when the postcard is transported during printing), at ten randomly selected points in each area. Based on the difference between the maximum and minimum gloss readings, variability in gloss is graded according to the following criteria.

A: The difference between the maximum and minimum gloss readings is less than 1.0

B: The difference between the maximum and minimum gloss readings is 1.0 or more and less than 2.0

C: The difference between the maximum and minimum gloss readings is 2.0 or more and less than 3.0

D: The difference between the maximum and minimum gloss readings is 3.0 or more and less than 4.0

E: The difference between the maximum and minimum gloss readings is 4.0 or more

The results are presented in Table 1.

The meanings of the abbreviations used in Table 1 are as follows.

Amo: Amorphous resin

Cry: Crystalline resin

Cry-MT: Melting temperature of the crystalline polyester resin

TABLE 1

| | Binder resins | | Toner particles | | | | | | | | | | |
|---|---|---|---|---|---|---|---|---|---|---|---|---|---|
| | | | | | Colored toner particles | | Transparent toner particles | | | | | | |
| | | | Particle diameter Dn | Cry-MT | Circularity | Relative area Sf of crystalline resin | Percentage % by | Percentage of ≤Dn particles % by | Circularity | Relative area Ss of crystalline resin | Cs − | Ss/ | Testing Variability |
| | Amo | Cry | μm | ° C. | Cf | % | number | number | Cs | % | Cf | Sf | in gloss |
| Example 1 | A1 | B1 | 5.0 | 73 | 0.945 | 20 | 6 | 92 | 0.975 | 65 | 0.03 | 3.25 | A |
| Example 2 | A1 | B1 | 5.0 | 73 | 0.945 | 20 | 6 | 92 | 0.977 | 65 | 0.032 | 3.25 | A |
| Example 3 | A1 | B1 | 5.0 | 73 | 0.947 | 20 | 3.5 | 88 | 0.977 | 70 | 0.03 | 3.5 | A |
| Example 4 | A1 | B1 | 5.0 | 73 | 0.946 | 25 | 8.2 | 92 | 0.971 | 75 | 0.025 | 3 | A |
| Example 5 | A1 | B1 | 5.0 | 73 | 0.945 | 20 | 0.2 | 91 | 0.975 | 65 | 0.03 | 3.25 | B |
| Example 6 | A1 | B1 | 5.0 | 73 | 0.945 | 20 | 9.8 | 91 | 0.977 | 65 | 0.032 | 3.25 | B |
| Example 7 | A1 | B1 | 3.5 | 73 | 0.945 | 20 | 6 | 72 | 0.981 | 65 | 0.036 | 3.25 | B |
| Example 8 | A1 | B1 | 5.0 | 73 | 0.945 | 20 | 6 | 92 | 0.939 | 65 | −0.006 | 3.25 | D |
| Example 9 | A1 | B1 | 5.0 | 73 | 0.945 | 20 | 6 | 92 | 0.946 | 65 | 0.001 | 3.25 | D |
| Example 10 | A1 | B1 | 5.0 | 73 | 0.945 | 20 | 6 | 92 | 0.957 | 65 | 0.012 | 3.25 | C |
| Example 11 | A1 | B1 | 5.0 | 73 | 0.928 | 20 | 6 | 92 | 0.961 | 65 | 0.033 | 3.25 | D |

TABLE 1-continued

| | Binder resins Amo | Binder resins Cry | Particle diameter Dn μm | Cry-MT ° C. | Colored toner particles Circularity Cf | Colored toner particles Relative area Sf of crystalline resin % | Transparent toner particles Percentage % by number | Transparent toner particles Percentage of ≤Dn particles % by number | Transparent toner particles Circularity Cs | Transparent toner particles Relative area Ss of crystalline resin % | Cs − Cf | Ss/Sf | Testing Variability in gloss |
|---|---|---|---|---|---|---|---|---|---|---|---|---|---|
| Example 12 | A1 | B1 | 5.0 | 73 | 0.932 | 20 | 6 | 92 | 0.965 | 65 | 0.033 | 3.25 | C |
| Example 13 | A1 | B1 | 5.0 | 73 | 0.958 | 20 | 6 | 92 | 0.990 | 65 | 0.032 | 3.25 | C |
| Example 14 | A1 | B1 | 5.0 | 73 | 0.962 | 20 | 6 | 92 | 0.993 | 65 | 0.031 | 3.25 | D |
| Example 15 | A1 | B5 | 5.0 | 54 | 0.949 | 19.5 | 7 | 95 | 0.985 | 67.5 | 0.036 | 3.46 | D |
| Example 16 | A1 | B4 | 5.0 | 63 | 0.947 | 19.8 | 6.5 | 93 | 0.981 | 66 | 0.034 | 3.33 | C |
| Example 17 | A1 | B3 | 5.0 | 105 | 0.943 | 20.4 | 5.5 | 91 | 0.973 | 64.5 | 0.03 | 3.16 | C |
| Example 18 | A1 | B2 | 5.0 | 112 | 0.941 | 21.2 | 5 | 90 | 0.969 | 64 | 0.028 | 3.02 | D |
| Example 19 | A1 | B1 | 5.0 | 73 | 0.946 | 45 | 6 | 91 | 0.966 | 51 | 0.02 | 1.13 | D |
| Example 20 | A1 | B1 | 5.0 | 73 | 0.942 | 40 | 6 | 91 | 0.966 | 51 | 0.024 | 1.28 | C |
| Example 21 | A1 | B1 | 5.0 | 73 | 0.941 | 14.9 | 6 | 91.5 | 0.963 | 45 | 0.022 | 3.02 | D |
| Example 22 | A1 | B1 | 5.0 | 73 | 0.943 | 17 | 6 | 90.8 | 0.966 | 52 | 0.023 | 3.06 | C |
| Example 23 | A1 | B1 | 5.0 | 73 | 0.947 | 25.5 | 6 | 92 | 0.982 | 78 | 0.035 | 3.06 | C |
| Example 24 | A1 | B1 | 5.0 | 73 | 0.949 | 27 | 6 | 91.3 | 0.987 | 82 | 0.038 | 3.04 | D |
| Comparative Example 1 | A1 | B1 | 5.0 | 73 | 0.945 | 21 | 0.05 | 91 | 0.976 | 65 | 0.031 | 3.1 | E |
| Comparative Example 2 | A1 | B1 | 5.0 | 73 | 0.945 | 20 | 12 | 92 | 0.977 | 65 | 0.032 | 3.25 | E |
| Comparative Example 3 | A1 | B1 | 5.0 | 73 | 0.945 | 20 | 6 | 65 | 0.983 | 65 | 0.038 | 3.25 | E |

As can be seen from these data, the toners of Examples, compared with those of Comparative Examples, cause only minor variations in gloss when used to form a solid image repeatedly on a small and thick recording medium in a low-temperature environment.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A toner for developing an electrostatic charge image, the toner comprising:

toner particles including first toner particles and second toner particles, the first toner particles having a brightness of less than 90 and the second toner particles having a brightness of 90 or more, wherein:

the second toner particles constitute 0.1% by number or more and 10% by number or less of the toner particles; and in a size distribution of the second toner particles, toner particles having a diameter equal to or smaller than a number-average diameter Dn of the toner particles constitute 70% by number or more.

2. The toner according to claim 1 for developing an electrostatic charge image, wherein the second toner particles have a greater average circularity than the first toner particles.

3. The toner according to claim 2 for developing an electrostatic charge image, wherein there is a difference of 0.01 or more between the average circularity of the second toner particles and the average circularity of the first toner particles.

4. The toner according to claim 2 for developing an electrostatic charge image, wherein the average circularity of the first toner particles is 0.930 or more and 0.960 or less.

5. The toner according to claim 1 for developing an electrostatic charge image, wherein the first and second toner particles contain an amorphous resin and a crystalline resin as binder resins.

6. The toner according to claim 5 for developing an electrostatic charge image, wherein:

the crystalline resin is a crystalline polyester resin; and the crystalline polyester resin has a melting temperature of 60° C. or higher and 110° C. or lower.

7. The toner according to claim 5 for developing an electrostatic charge image, wherein in a cross-sectional observation of the first and second toner particles, Ss is larger than Sf, where Ss is a relative area of crystalline-resin domains to a particle cross-sectional area in the second toner particles, and Sf is a relative area of crystalline-resin domains to a particle cross-sectional area in the first toner particles.

8. The toner according to claim 7 for developing an electrostatic charge image, wherein the relative areas Sf and Ss of crystalline-resin domains to a particle cross-sectional area in the first and second toner particles, respectively, are such that $Ss/Sf \geq 1.2$.

9. The toner according to claim 7 for developing an electrostatic charge image, wherein the relative area Ss of crystalline-resin domains to a particle cross-sectional area in the second toner particles is 50% or more and 80% or less.

10. An electrostatic charge image developer comprising the toner according to claim 1 for developing an electrostatic charge image.

11. A toner cartridge that is attachable to and detachable from an image forming apparatus, the toner cartridge comprising:

the toner according to claim 1 for developing an electrostatic charge image.

12. A process cartridge that is attachable to and detachable from an image forming apparatus, the process cartridge comprising:

a developing component that contains the electrostatic charge image developer according to claim 10 and develops, using the electrostatic charge image developer, an electrostatic charge image on a surface of an image carrier to form a toner image.

13. An image forming apparatus comprising:

an image carrier;

a charging component that charges a surface of the image carrier;

an electrostatic charge image creating component that creates an electrostatic charge image on the charged surface of the image carrier;

a developing component that contains the electrostatic charge image developer according to claim 10 and develops, using the electrostatic charge image developer, the electrostatic charge image on the surface of the image carrier to form a toner image;

a transfer component that transfers the toner image on the surface of the image carrier to a surface of a recording medium; and a fixing component that fixes the toner image on the surface of the recording medium.

14. An image forming method comprising:

charging a surface of an image carrier;

creating an electrostatic charge image on the charged surface of the image carrier;

developing, using the electrostatic charge image developer according to claim 10, the electrostatic charge image on the surface of the image carrier to form a toner image;

transferring the toner image on the surface of the image carrier to a surface of a recording medium; and fixing the toner image on the surface of the recording medium.

* * * * *